United States Patent [19]

Hwang

[11] Patent Number: 5,348,225
[45] Date of Patent: Sep. 20, 1994

[54] COOLING/WARMING CONTROL SYSTEM FOR AN AIR-CONDITIONER

[75] Inventor: Eui K. Hwang, Suwon, Rep. of Korea

[73] Assignee: Samsung Electronics Co., Ltd., Suwon, Rep. of Korea

[21] Appl. No.: 98,723

[22] Filed: Jul. 29, 1993

[30] Foreign Application Priority Data

Jul. 30, 1992 [KR] Rep. of Korea ............. 92-13677

[51] Int. Cl.$^5$ .................. B43L 5/00; G05D 23/00
[52] U.S. Cl. ................................... 236/51; 33/1 V; 73/149; 165/11.1
[58] Field of Search ............. 236/1 R, 51, 94; 33/1 P, 1 V; 73/149; 165/11.1

[56] References Cited

FOREIGN PATENT DOCUMENTS 002608   1/1983   Japan ........................ 33/1 V
5060357  3/1993   Japan ........................ 236/1 R Primary Examiner—William E. Wayner
Attorney, Agent, or Firm—Burns, Doane, Swecker & Mathis

[57] ABSTRACT

A cooling/warming control system of an air-conditioner comprises a transmitting portion and a receiving portion for radiating ultra-sonic waves from the air-conditioner to a room wall surface and receiving the ultra-sonic pulses reflected therefrom using a number of ultra-sonic wave sensors. A microcomputer calculates the time interval from the moment the radiation of the ultra-sonic pulses are transmitted until the reflecting wave pulses are received, measures the room area or volume and compares the measurement with the previous set area or volume, determines the magnitude of the cooling/warming load and then controls the load operating system connected thereto in order to operate loads in multiple stages according to the room temperature.

12 Claims, 4 Drawing Sheets

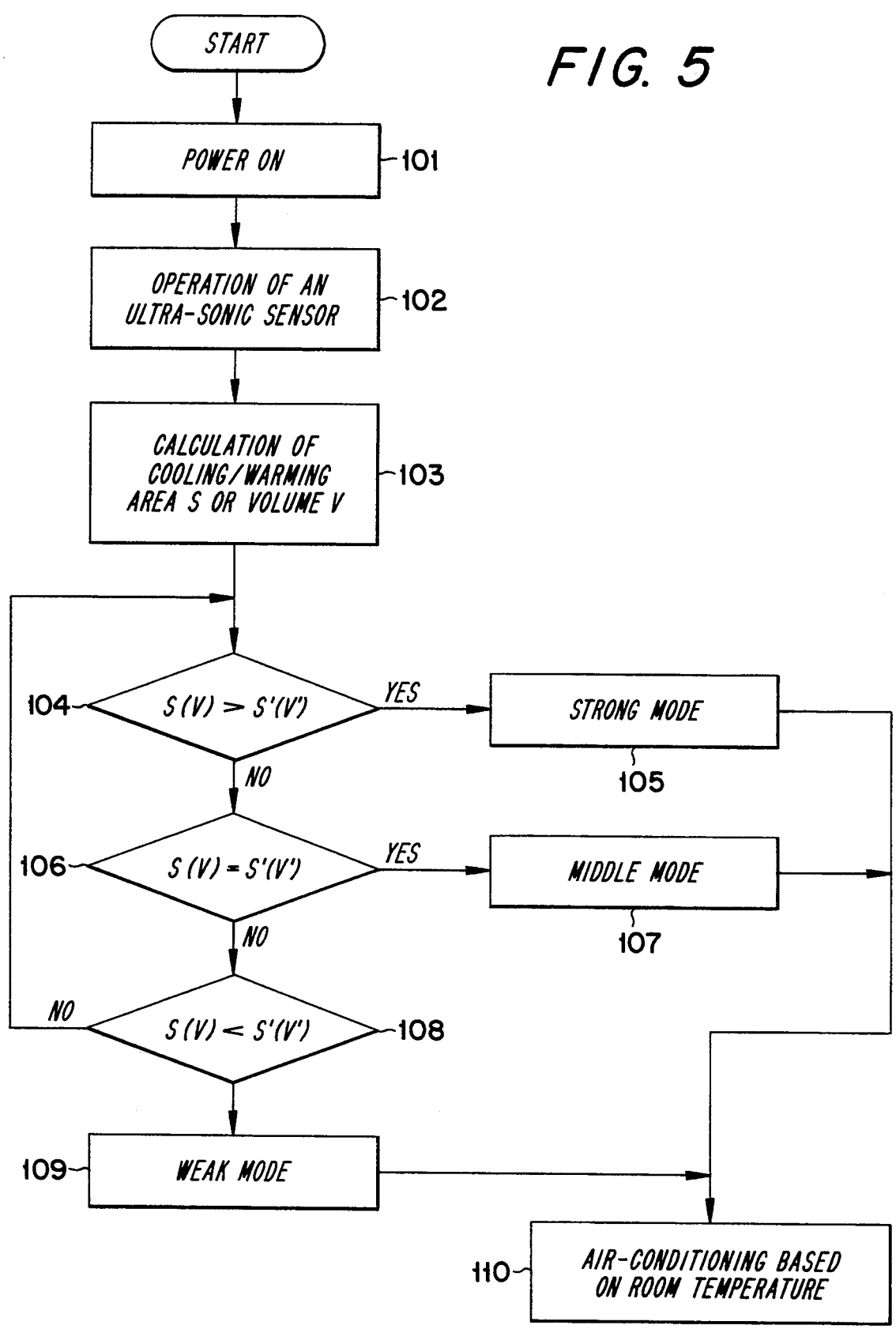

COOLING/WARMING CONTROL SYSTEM FOR AN AIR-CONDITIONER

BACKGROUND OF THE INVENTION

1. Field of The Invention

The present invention is related to providing an air-conditioner, particularly to providing the cooling/warming control system for an air-conditioner, with a means for automatically controlling its cooling/warming capacity to accommodate the load to be air-conditioned.

2. Prior Art

Generally, an air-conditioner having a cooling/warming function for use in the home or similar use commonly provides a refrigerating cycle by means of a compressor 31, a condenser 32, a high pressure valve 33, a capillary tube 34 and an evaporator 35 connected in sequence to one another, to which FIG. 1 refers. The air-conditioner performs the cooling or warming operation by directing the flow of refrigerant in either a forward or reverse direction. Thus, the area to be cooled or heated must be within the range of the air conditioner's capacity.

For example, in the case of cooling a room, the smaller the room area, the less output from the air-conditioner is required as the room temperature is reached and maintained at the predetermined cooling condition. The air-conditioner cooling load is thus reduced in compliance with the smaller room area requirement. On the other hand, the cooling load increases when the room area is relatively larger.

Similarly, an air-conditioner used for warming is subject to the same phenomena as during the cooling operation, so that the warming load is predetermined according to the corresponding magnitude of the bigger room area.

Nevertheless, the air-conditioner performs the room cooling/ warming function in a manner Whereby a temperature sensor detects the room temperature without evaluating the room area and then calculates the difference between the detected actual room temperature and the temperature setting of the room to be air-conditioned. A microcomputer constituting the control portion of the air-conditioner compares the current room temperature with the setting temperature and continuously evaluates the temperatures in order to minimize the difference between the two. Thus, when the current room temperature is equal to the setting temperature, the load operation of the air conditioner is temporarily halted. Thereafter, when actual room temperature deviates from the setting, the cooling operation is activated. A larger difference causes the air-conditioner to be operated at a maximum level, whereas a gradual reduction in the difference means the switching into a moderate-level operation.

The warming operation of the air-conditioner is similar to the cooling operation. When the air-conditioner is switched into the warming mode in response to the desired room temperature setting, the microcomputer compares the current room temperature with the setting temperature and continues to evaluate the deviation in order to control the room warming function. For example, if the current room temperature is much higher than the setting temperature, or the temperature deviation between the two is very large, the air-conditioner exerts its maximum capacity to perform the necessary operation, whereas when the deviation is reduced, the operation mode is gradually reduced.

The conventional air-conditioner has disadvantages in that the cooling/warming efficiency is rather low, and the power consumption is relatively higher because the operation control uses a temperature sensor. The cooling/warming control of the air-conditioner is performed in response to the room temperature as sensed by a temperature sensor, regardless of the size of the room area. This causes the air-conditioner to be operated at the maximum mode without evaluating the magnitude of the cooling/warming load, causing the initial operating power consumption to be very high. The larger cooling/warming load causes the operating cycles to be extremely variable, and thus an efficient cooling/warming operation cannot be expected.

In order to resolve these problems in the prior art, the main object of the present invention is to provide a system for calculation of the cooling/warming load and automatically controlling the operation of the air-conditioner.

Another object of the present invention is to provide a system which includes at least one ultra-sonic sensor which enables the sensors to measure the corresponding room dimensions in order to compute the size of the area to be air-conditioned and to automatically control the operation of the air-conditioner.

Another object of the present invention is to provide a method for enabling at least two sensors to measure the corresponding room dimensions, computing the size of the area to be air-conditioned and subsequently computing the room volume, and for automatically controlling the operation of an air-conditioner.

SUMMARY OF THE INVENTION

Accordingly, in order to accomplish these objects and features, a cooling/warming control system of the present invention comprises: at least one ultra-sonic sensor for radiating ultra-sonic waves against a room wall surface and receiving the reflected waves; a transmitting portion for generating pulse signals so that said ultra-sonic sensor can radiate ultra-sonic waves; a receiving portion for receiving said reflected signals, amplifying these signals and converting these analog signals into digital signals; a microcomputer for calculating the time duration between the receiving of said pulse signals at said receiving portion until the sampling of said reflected signals, measuring the corresponding distances of said ultra-sensors and computing the area or volume of the room and determining the magnitude of the cooling/warming load; and a load driving portion for operating the corresponding loads according to the control signals of said micro-computer.

According to the present invention, the ultra-sonic sensor radiates powerful ultra-sonic energy pulses from an air-conditioner to a fixed reflector such as a wall surface and receives the ultra-sonic pulses reflected therefrom. A microcomputer evaluates the time between the radiation of the ultra-sonic pulses and the receiving of the reflected pulses, measures the room area or the room volume, compares the calculation with the previous set area or volume calculation, determines the magnitude of the cooling/warming load and controls the load driving portion connected thereto to operate the loads in multiple steps.

Wherein the room area is referred to as a normal room floor area, assuming that three ultra-sonic sensors are properly mounted on the air-conditioner fixed to one side wall of room, the room area is calculated as the sum of the areas of: either at the upper or lower surface of the air-conditioner, multiplying the distance measured with a right side sensor by the right side width of the air-conditioner, multiplying the distance measured with a left side sensor by the left side width of the air-conditioner, multiplying the distance measured with a front side sensor by a front side width of the air-conditioner, multiplying the distance measured with the front side sensor by the distance measured with the right side sensor, and multiplying the distance measured with the front side sensor by the distance measured with the left side sensor. Otherwise, other methods for obtaining the area to be air-conditioned can be performed by changing the positioning of the ultra-sonic sensor.

The room volume is calculated by multiplying the floor area as obtained in the above computation method by the room ceiling height measured with at least one ultrasonic sensor.

BRIEF DESCRIPTION OF THE DRAWINGS

The present invention will be described below in detail with reference to the attached drawings, wherein:

FIGS. 4A and 4B show preferred embodiments of the room volume computation method of the room where the air-conditioner is installed, in which FIG. 4A is a plan view of a room, and FIG. 4B is a side view of a room; and FIG. 5 is a flow chart illustrating a cooling/warming control method according to the present invention.

DETAILED DESCRIPTION OF THE INVENTION

Figure 1:
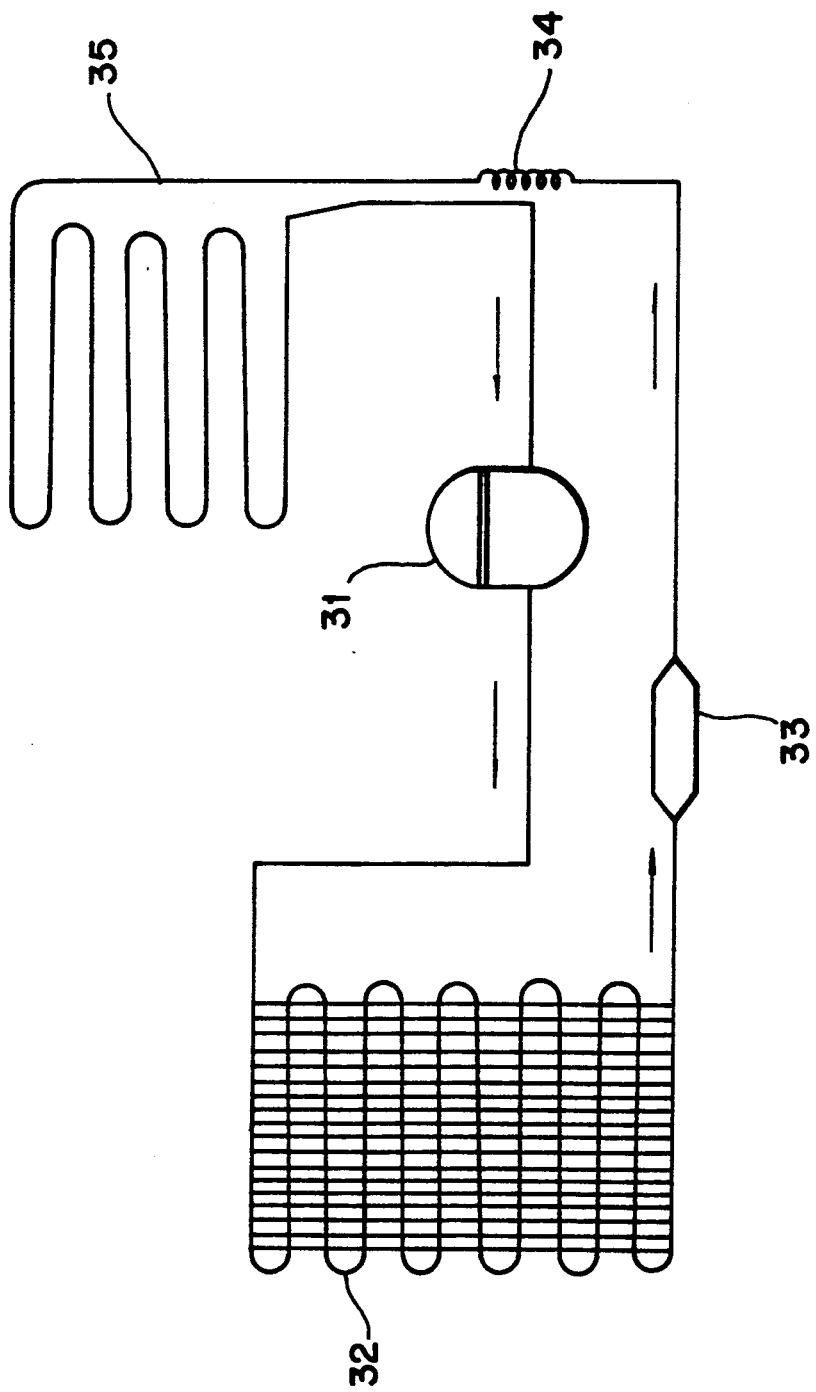
FIG. 1 is a circuit of a refrigeration cycle adapted to a conventional cooling/warming air-conditioner.
Figure 2:
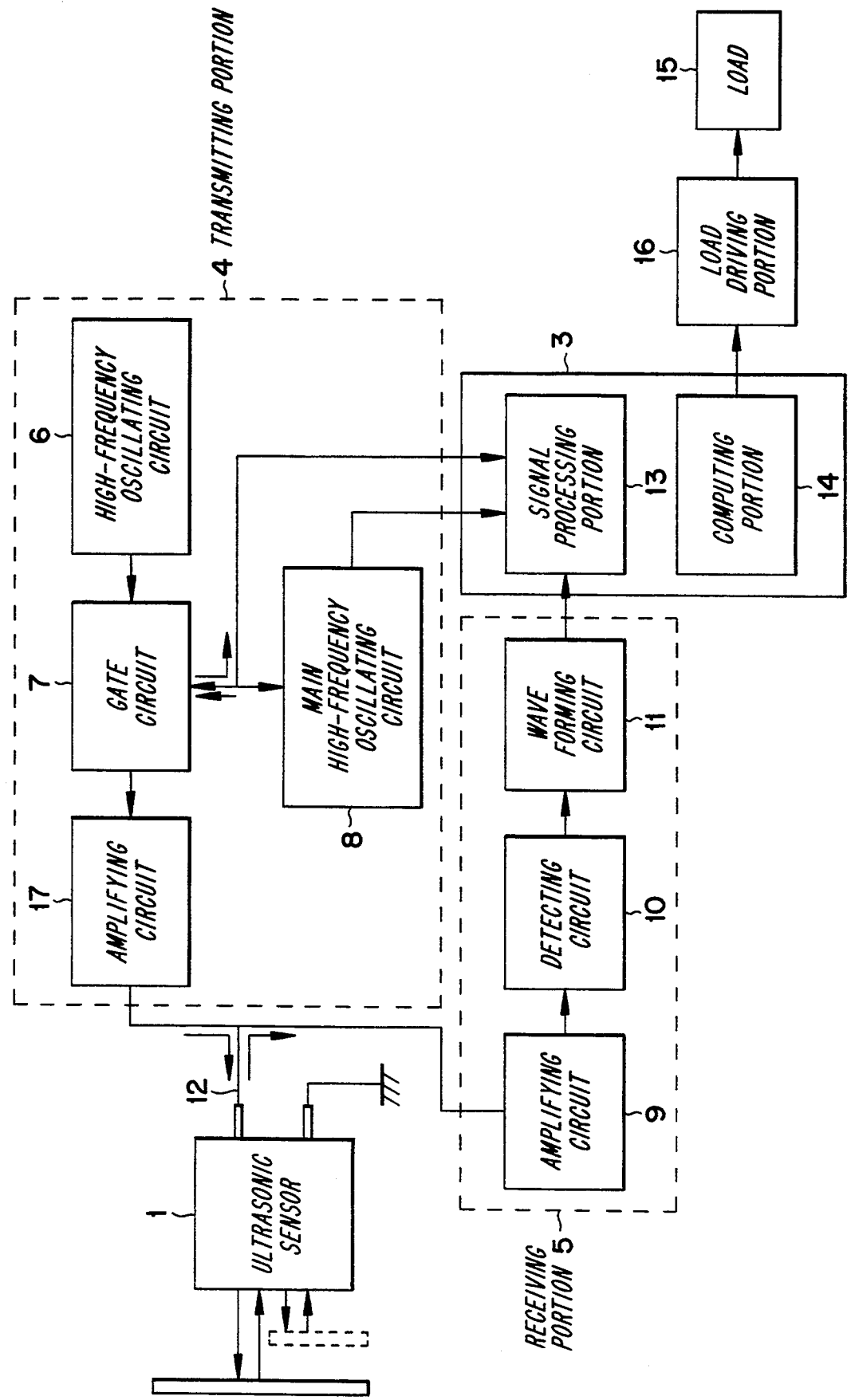
FIG. 2 is a block diagram illustrating a cooling/warming control system including an ultra-sonic sensor connected thereto according to the present invention.

FIG. 2 is a schematic block diagram of a cooling/warming control system including an ultra-sonic sensor connected thereto. The ultra-sonic sensor 1 radiates ultra-sonic waves against any one wall surface of the room while it receives the reflected waves from the corresponding wall surface. The ultra-sonic sensor 1 is connected by a transmitting portion 4 and a receiving portion 5 to a microcomputer 3, wherein the transmitting portion 4 generates pulse signals which are converted into ultra-sonic energy and transmits these signals to the ultra-sonic sensor 1, and the receiving portion 5 receives the analog reflecting signals of the ultra-sonic waves from the ultra-sonic sensor 1 and converts these analog signals into digital signals and transmits digital signals to the microcomputer 3.

The transmitting portion 4 comprises a high frequency oscillating circuit 6 for generating a high frequency signal converted into the ultra-sonic energy, a gate circuit 7 connected to the high frequency oscillating circuit 6 for generating a pulse signal and an amplifying circuit 17 for amplifying the pulse signal applied to the ultra-sonic sensor 1. The gate circuit 7 is connected to a main oscillating circuit 8 constituting a system timer, for generating a pulse signal equal to the clock period thereof as well as applying it to the amplifying circuit 17 and the microcomputer 3.

The receiving portion 5 comprises an amplifying circuit 9 for improving the clarity of the reflected waves inputted into the ultra-sonic sensor 1 and for removing any noise components, a detecting circuit 10 connected to the amplifying circuit 10 9 for synchronizing the received reflection signals to a previous set frequency and detecting the synchronized frequency signals and a waveforming circuit 11 for converting the detected analog signals into digital signals.

In the transmitting portion 4, the high frequency signals from the high frequency oscillating circuit 6 are synchronized at the gate circuit 7 so that the synchronized pulse signals are transmitted to the amplifying portion 17 and the microcomputer 3. The amplifying circuit 17 transmits the pulse signals through a bi-directional bus 12 to the ultra-sonic sensor 1. The ultra-sonic sensor 1 radiates the ultra-sonic sound waves to the wall surface of the room and receives the reflected signals, the amplified signals are then transmitted to the amplifying circuit 9 in the receiving portion 5. The amplifying circuit 9 amplifies the inputted analog signals at a predetermined level and then transmits its outputting signals to the detecting circuit 10. The detecting circuit 10 transmits only analog signals with a given frequency to the waveforming circuit 11 in order to convert the analog signals into digital signals. The waveforming circuit 11 transmits the waveformed digital signals to a signal processing portion 13 in the microcomputer 3. The signal processing portion 13 samples the digital signals of the reflecting waves and it then calculates the time from the moment the signal is transmitted from the gate circuit 7 until the moment the sampled reflected waves are received. A computing control portion 14 is connected to the signal processing portion 13 in order to receive the time duration signal so that it calculates the high frequency reflecting distance as described below.

Figure 3:
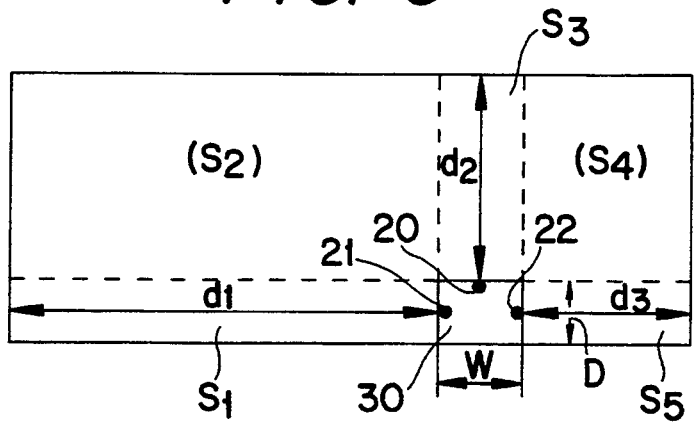
FIG. 3 is a view illustrating a preferred embodiment of the method for computing the room area by a microcomputer evaluating the plan view of room where the air-conditioner is installed.

In such a manner, multiples o#the ultra-sonic reflecting distances corresponding to at least two ultra-sonic sensors are measured, and the plan area or volume of the room in which the ultra sonic sensors are arranged is calculated on the basis of the distances measured at the computing control portion 14 of the air-conditioner 30 as shown in FIG. 3.

Referring to FIG. 3, considering a room space with rectangular coordinates, the ultra-sonic sensors 21 and 22 attached to the left and right sides of the air-conditioner 30 are used to measure the distances d1 and d3 therefrom to the corresponding wall surface on an X-axis line, and the ultra-sonic sensors 20 attached to the front of the air-conditioner 30 are used to measure the distance d2 therefrom to the corresponding wall surface on a Y-axis line. The signals generated through the transmitting portion 4 and the receiving portion 5 are then supplied to the signal processing portion 13, and thus the computing control portion 14 calculates the cooling or warming area S according to the system program using the analyzed data at the signal processing portion 13 according to the following formula 1:

$$S = d1 \cdot D(S1) + d1 \cdot d2(S2) + W \cdot d2(S3) + d2 \cdot d3(S4) + d3 \cdot D(S5) \quad (1)$$

Wherein D indicates the side distance of the air-conditioner 30, and W indicates the width distance of the air-conditioner 30.

On the other hand, this embodiment illustrates a method of computing the room area by using three ultra-sonic sensors, but an alternative embodiment is possible in which one ultra-sensor is mounted in a manner whereby it can rotate on a pivot center on the rear wall surface, so that the microcomputer 3 facilitates the computation of the room area with a more simple formula than formula (1). Alternatively several ultra-sonic sensors can be mounted on the corners of the appliance to avoid making errors in calculating the room area, in the case where the room space has a number of angles or is formed in an almost circular shape, thereby providing a more exact area computation in order to determine the proper cooling/warming operating capacity.

Figure 4A:
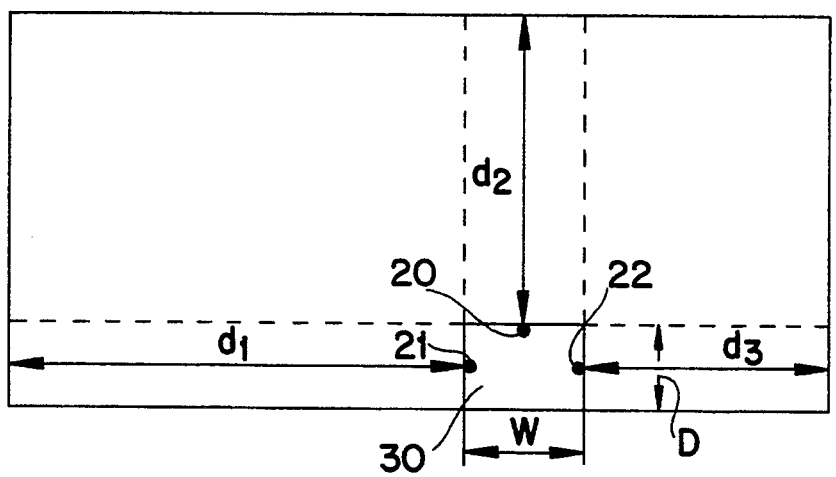
Figure 4B:
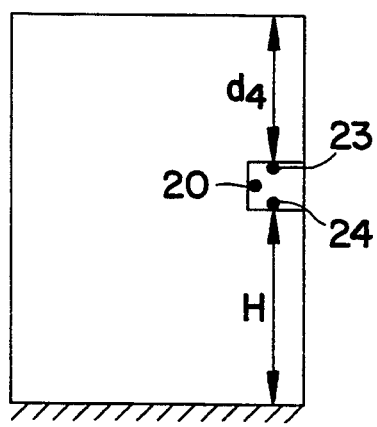

Furthermore, the present invention can automatically control the operation of the air-conditioner, depending on the computation of the room volume. Considering the room space to be space coordinates as shown in FIGS. 4A and 4B, the room area is initially calculated based on the distances measured on the X and Y coordinates as described above, and then the height of the room is measured by reference to the Z axis.

The ultra-sonic sensors 23 and 24 are mounted on the upper and lower surfaces of the air-conditioner 30. These sensors are used in measuring the distance H between the lower surface of the air conditioner 30 and the floor of the room and the distance d4 between the upper surface of the air conditioner 30 and the ceiling surface of the room. Thus, the reflected analog signals obtained through the transmitting portion 4 and the receiving portion 5 are transmitted to the signal processing portion 13 to make data corresponding to the corresponding ultra-sonic sensors. The computing portion 14 uses this data to compute the cooling/warming load volume v according to the microcomputer 3 system programing according the following formula (2):

$$V = d1 \cdot D \cdot (d4+H) + d1 \cdot d2 \cdot (d4+H) + d2 \cdot W \cdot (d4+H) + d3 \cdot D \cdot (d4+H) + D \cdot W \cdot (d4+H) \quad (2)$$

As illustrated in the flow chart in FIG. 5, the cooling/warming operation of an air-conditioner 30 is performed.

A microcomputer 3 inputs the room setting temperature at step 101, after a power source is applied to the system. At that time, the operation of the air-conditioner 30 is executed according to the cooling or warming setting mode. Next, step 102 is performed so that each of a number of ultra-sonic sensors 1 radiates ultra-sonic energy to the wall surface of the room and then receives the reflected ultra-sonic signals.

The microcomputer 3 calculates the time T from the moment a clock signal is received from a main oscillating circuit 8 until the moment the reflected ultra-sonic signal is able to be input through the receiving portion 5 to a signal processing portion 13, wherein the time T is calculated based on the following formula:

$$T = 2d/c \quad (3)$$

Herein, d is the distance 3 to the wall surface of room analyzed by the microcomputer 3, and c is the velocity of the ultra-sonic waves.

The microcomputer 3 calculates with each of a number of sensors all distances to the wall surfaces by using the formula (3) and the room area S according to the previously set programming as illustrated in FIG. 2 at step 103. Step 103 proceeds to step 104 to compare the measured room area S with a previous set standard cooling/warming load area S', wherein the standard cooling/warming load area defines the operation mode associated with the area S' corresponding to "MEDIUM" among the high, medium and low of a typical reference load capacity.

Thereafter, proceeding through steps 104, 106 and 108, if S > S' when the standard cooling/warming load area S' is compared to the room area S to be air-conditioned, the microcomputer 3 performs step 105 to control the load operation system 16 connected thereto, so that load 15 of the air-conditioner 30 as shown in FIG. 2 is operated at a high speed in the high mode.

If S = S' at step 106, step 106 proceeds to step 107 in order to lower the speed of the load 15 so that the air-conditioner 30 is maintained in the medium mode.

If S < S' at step 108, step 108 proceeds to step 109 to gradually reduce the speed of the load 15 so that the air-conditioner 30 is maintained in the low mode.

Furthermore, the operation mode of each of these high, medium and low modes is subdivided into first, second and third stages according to the operating conditions. At step 109 the air-conditioner 30 adjusts the room temperature according to the room cooling/warming load area in the corresponding operation mode. Also, with respect to the room volume v, the cooling/warming operation mode is calculated by the same method as the control method of the room area, According to the present invention, when the room is being cooled the cooling/warming control system operates an air-conditioner in the high mode at the first stage, if the setting temperature is higher than the current room temperature; the cooling/warming control system operates the air-conditioner at the second stage in the medium mode, if the setting temperature is equal to the current room temperature; and the cooling/warming control system operates the air-conditioner at the third stage in the low mode, if the setting temperature is lower than the current room temperature.

On the contrary, when the room warming cycle begins, the cooling/warming control system operates the air-conditioner at the third stage of the low mode, if the setting temperature is higher than the current room temperature; the cooling/warming control system operates the air-conditioner at the second stage of the medium mode, if the setting temperature is equal to the current room temperature; and the cooling/warming control system operates the air-conditioner at the first stage of the high mode, if the setting temperature is lower than the current room temperature.

As described above, according to the present invention a cooling/warming control system calculated the cooling/warming load area or volume using a predetermined number of ultra-sonic sensors and controls the operation of the air-conditioner at the corresponding mode associated with the cooling/warming load. The cooling/warming efficiency of the air conditioner is thereby enhanced, and the power consumption is reduced.

What is claimed is:

1. A cooling/warming control system of an air-conditioner comprising:
   at least one ultrasonic wave sensor for radiating ultrasonic waves to a room wall surface and receiving reflected waves;
   a transmitting portion for generating pulse signals so that said ultrasonic sensor can radiate said ultrasonic waves;

a receiving portion for receiving said reflected signals, amplifying said reflected signals and converting said reflected signals into digital signals;

a microcomputer for calculating the time interval between the receipt of said pulse signals at said receiving portion until the sampling of said reflected signals, measuring the corresponding radiating distances of said ultrasensors, computing the room area from the measured distances, determining the magnitude of a cooling/warming load in accordance with the computed room area and generating control signals based on the determined magnitude; and a load operating system for operating the loads of the air conditioner according to the control signals of said microcomputer.

2. The cooling/warming control system of an air-conditioner as claimed in claim 1, wherein said transmitting portion comprises:

a high frequency oscillating circuit for generating a high frequency signal to be converted into ultrasonic energy waves;

a gate circuit connected to said high frequency oscillating circuit for generating a constant period pulse signal;

a main oscillating circuit for generating a pulse signal equal to a specific time period and transmitting said pulse signal to said gate circuit; and an amplifying circuit for amplifying the pulse signal from said gate circuit.

3. The cooling/warming control system of an air-conditioner as claimed in claim 1, wherein said receiving portion comprises:

an amplifying circuit for increasing the gain of the reflected signals input into said ultrasonic wave sensor and removing noise components;

a detecting circuit connected to said amplifying circuit for synchronizing the received reflected signals to a previously set frequency and detecting the synchronized frequency signals; and a waveforming circuit for converting the detected reflected signals into digital signals.

4. The cooling/warming control system of an air-conditioner as claimed in claim 1, wherein said microcomputer calculates a room volume using additional ultrasensors to calculate room height and determines the cooling/warming load in accordance with the calculated room volume.

5. The cooling/warming control system of an air-conditioner as claimed in claim 1, wherein said microcomputer controls the operation of an air-conditioner at either the first, second or third stages according to the room temperature in any one of the operation modes after calculating the cooling/warming load.

6. The cooling/warming control system of an air-conditioner as claimed in claim 1, wherein said ultrasonic sensors are arranged on the same plane to enable said microcomputer to calculate the room area and volume.

7. A cooling/warming control system of an air-conditioner comprising:

at least one ultrasonic wave sensor for radiating ultrasonic waves to a room wall surface and receiving reflected waves;

a transmitting portion for generating pulse signals so that said ultrasonic sensor can radiate said ultrasonic waves;

a receiving portion for receiving said reflected signals, amplifying said reflected signals and converting said reflected signals into digital signals;

a microcomputer for calculating the time interval between the receipt of said pulse signals at said receiving portion until the sampling of said reflected signals, measuring the corresponding radiating distances of said ultrasensors, computing the room size from the measured distances, determining the magnitude of a cooling/warming load in accordance with the computed room size and generating control signals based on the determined magnitude; and control means for operating said air-conditioner in accordance with the control signals generated by said micro-computer.

8. The cooling/warming control system of an air-conditioner as claimed in claim 7, wherein said transmitting portion comprises:

a high frequency oscillating circuit for generating a high frequency signal to be converted into ultrasonic energy waves;

a gate circuit connected to said high frequency oscillating circuit for generating a constant period pulse signal;

a main oscillating circuit for generating a pulse signal equal to a specific time period and transmitting said pulse signal to said gate circuit; and an amplifying circuit for amplifying the pulse signal from said gate circuit.

9. The cooling/warming control system of an air-conditioner as claimed in claim 7, wherein said receiving portion comprises:

an amplifying circuit for increasing the gain of the reflected signals input into said ultrasonic wave sensor and removing noise components;

a detecting circuit connected to said amplifying circuit for synchronizing the received reflected signals to a previously set frequency and detecting the synchronized frequency signals; and a waveforming circuit for converting the detected reflected signals into digital signals.

10. The cooling/warming control system of an air-conditioner as claimed in claim 7, wherein the computed room size is the area of the room.

11. The cooling/warming control system of an air-conditioner as claimed in claim 7, wherein the computed room size is the volume of the room.

12. The cooling/warming control system of an air-conditioner as claimed in claim 7, wherein said microcomputer controls the operation of an air-conditioner at either the first, second or third stages according to the room temperature in any one of the operation modes after calculating the cooling/warming load.

* * * * *